United States Patent
Iyengar et al.

(10) Patent No.: US 10,992,518 B2
(45) Date of Patent: Apr. 27, 2021

(54) SEGREGATION OF REAL TIME EVENT STREAM

(71) Applicant: SAP SE, Walldorf (DE)

(72) Inventors: Venkatesh Iyengar, Bangalore (IN); Abhradeep Kundu, Bangalore (IN); Amarendu Singh, Bangalore (IN); Harish Kumar Sampangi Rama, Bangalore (IN); Sudhakar Bommenahalli Ramamurthy, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/405,882

(22) Filed: May 7, 2019

(65) Prior Publication Data

US 2020/0358650 A1 Nov. 12, 2020

(51) Int. Cl.
*H04L 12/24* (2006.01)
*H04L 29/08* (2006.01)

(52) U.S. Cl.
CPC ......... *H04L 41/0677* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 2017/0206766 A1* | 7/2017 | Child | G08B 21/0211 |
| 2018/0063556 A1* | 3/2018 | Kalmanson | H04L 65/605 |
| 2019/0036986 A1* | 1/2019 | Sathyanarayana | H04L 65/608 |
| 2019/0188980 A1* | 6/2019 | Viswanathan | G08B 13/19602 |
| 2019/0391861 A1* | 12/2019 | Emerick | G06F 16/2477 |
| 2019/0392001 A1* | 12/2019 | Carothers | G06F 16/9024 |

* cited by examiner

*Primary Examiner* — Diane L Lo
(74) *Attorney, Agent, or Firm* — Mintz Levin Cohn Ferris Glovsky and Popeo, P.C.

(57) ABSTRACT

A method may include segregating an event stream that includes events associated with a cloud-based application hosted on a first remote resource and a second remote resource. The events may include metrics indicative of a state of the first remote resource and/or the second remote resource. The event stream may be segregated into a first child stream including events associated with the first remote resource and a second child stream including events associated with the second remote resource. The first child stream and/or the second child stream may be analyzed to identify a pattern indicative of a fault at the first remote resource and/or the second remote resource. An alert may be sent to in order to notify a client of the fault at the first remote resource and/or the second remote resource. Related systems and articles of manufacture are also provided.

20 Claims, 5 Drawing Sheets

SEGREGATION OF REAL TIME EVENT STREAM

FIELD

The present disclosure generally relates to cloud computing and, more specifically, to the segregation of real time event streams associated with a cloud-based computing resource.

BACKGROUND

In a cloud computing environment, multiple clients may be served by a shared pool of computing resources including, for example, computer networks, servers, storage, applications, services, and/or the like. For instance, many enterprises may rely on cloud-based applications providing solutions for sourcing, procurement, payments, and/or the like. Such cloud-based applications may be available as software-as-a-service (SaaS), which means that the applications are hosted by a third party service provider on remote resources housed in one or more data centers. Clients interacting with the cloud-based applications may affect the state of the remote resources hosting the cloud-based applications. Meanwhile, the third party service provider may rely on metrics indicative of the state of the remote resources in order to manage and/or troubleshoot the remote resources.

SUMMARY

Methods, systems, and articles of manufacture, including computer program products, are provided for segregating real time event streams associated with a cloud-based computing resource. In some implementations of the current subject matter, there is provided a system. The system can include at least one data processor. The system can further include at least one memory storing instructions that result in operations when executed by the at least one data processor. The operations can include: receiving an event stream including a plurality of events associated with a cloud-based application, the cloud-based application being hosted on a first remote resource and a second remote resource, the plurality of events including one or more metrics indicative of a state of the first remote resource and/or the second remote resource; segregating, based at least on an identifier included with each of the plurality of events, the event stream, the event stream being segregated into a first child stream and a second child stream, the first child stream including events associated with the first remote resource, and the second child stream including events associated with the second remote resource; analyzing the first child stream and/or the second child stream to identify a pattern in the first child stream and/or the second child stream, the pattern indicative of a fault at the first remote resource associated with the first child stream and/or the second remote resource associated with the second child stream; and sending, to a first client, an alert comprising a notification of the fault at the first remote resource and/or the second remote resource.

In some variations, one or more of the features disclosed herein including the following features can optionally be included in any feasible combination. The one or more metrics may include a quantity of connections, memory use, a host level central processing unit (CPU) utilization, and/or a network level disk usage.

In some variations, the pattern may include a decrease in a value of a metric, an increase in a difference between an estimated value of the metric and actual value of the metric, and/or the difference between the estimated value of the metric and the actual value of the metric exceeding a threshold value. The pattern may further include the decrease in the value of the metric, the increase in the difference between the estimated value of the metric and the actual value of the metric, and/or the difference between the estimated value of the metric and the actual value of the metric exceeding the threshold value persisting over a threshold quantity of events and/or a threshold length of time.

In some variations, the identifier included with each of the plurality of events may include a first hostname of the first remote resource and a second hostname of the second remote resource.

In some variations, a priority for the alert may be determined based at least on the pattern present in the first child stream and/or the second child stream.

In some variations, one or more recipients for the alert may be identified based at least on the pattern present in the first child stream and/or the second child stream. The one or more recipients may include the first client but exclude a second client based at least on the second client having already received the alert.

In some variations, the event stream may be received from a streaming dataflow engine. The event stream may include a real time event stream the streaming dataflow engine collects from a cloud platform including the first remote resource and the second remote resource.

In some variations, the event stream may be sorted based at least on a timestamp included with each of the plurality of events before the event stream is segregated into the first child stream and the second child stream.

In another aspect, there is provided a method for segregating real time event streams associated with a cloud-based computing resource. The method can include: receiving an event stream including a plurality of events associated with a cloud-based application, the cloud-based application being hosted on a first remote resource and a second remote resource, the plurality of events including one or more metrics indicative of a state of the first remote resource and/or the second remote resource; segregating, based at least on an identifier included with each of the plurality of events, the event stream, the event stream being segregated into a first child stream and a second child stream, the first child stream including events associated with the first remote resource, and the second child stream including events associated with the second remote resource; analyzing the first child stream and/or the second child stream to identify a pattern in the first child stream and/or the second child stream, the pattern indicative of a fault at the first remote resource associated with the first child stream and/or the second remote resource associated with the second child stream; and sending, to a first client, an alert comprising a notification of the fault at the first remote resource and/or the second remote resource.

In some variations, one or more of the features disclosed herein including the following features can optionally be included in any feasible combination. The one or more metrics may include a quantity of connections, memory use, a host level central processing unit (CPU) utilization, and/or a network level disk usage.

In some variations, the pattern may include a decrease in a value of a metric, an increase in a difference between an estimated value of the metric and actual value of the metric, and/or the difference between the estimated value of the metric and the actual value of the metric exceeding a threshold value. The pattern may further include the decrease in the value of the metric, the increase in the difference between the estimated value of the metric and the actual value of the metric, and/or the difference between the estimated value of the metric and the actual value of the metric exceeding the threshold value persisting over a threshold quantity of events and/or a threshold length of time.

In some variations, the identifier included with each of the plurality of events may include a first hostname of the first remote resource and a second hostname of the second remote resource.

In some variations, the method may further include determining, based at least on the pattern present in the first child stream and/or the second child stream, a priority for the alert.

In some variations, the method may further include identifying, based at least on the pattern present in the first child stream and/or the second child stream, one or more recipients for the alert. The one or more recipients may include the first client but exclude a second client based at least on the second client having already received the alert.

In some variations, the event stream may be received from a streaming dataflow engine. The event stream may include a real time event stream the streaming dataflow engine collects from a cloud platform including the first remote resource and the second remote resource.

In some variations, the method may further include sorting, based at least on a timestamp included with each of the plurality of events, the event stream before segregating the event stream into the first child stream and the second child stream.

In another aspect, there is provided a non-transitory computer readable medium storing instructions. The instructions can be executed by at least one data processor to result in operations. The operations can include: receiving an event stream including a plurality of events associated with a cloud-based application, the cloud-based application being hosted on a first remote resource and a second remote resource, the plurality of events including one or more metrics indicative of a state of the first remote resource and/or the second remote resource; segregating, based at least on an identifier included with each of the plurality of events, the event stream, the event stream being segregated into a first child stream and a second child stream, the first child stream including events associated with the first remote resource, and the second child stream including events associated with the second remote resource; analyzing the first child stream and/or the second child stream to identify a pattern in the first child stream and/or the second child stream, the pattern indicative of a fault at the first remote resource associated with the first child stream and/or the second remote resource associated with the second child stream; and sending, to a first client, an alert comprising a notification of the fault at the first remote resource and/or the second remote resource.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to segregating real time event streams associated with a cloud-computing resource, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
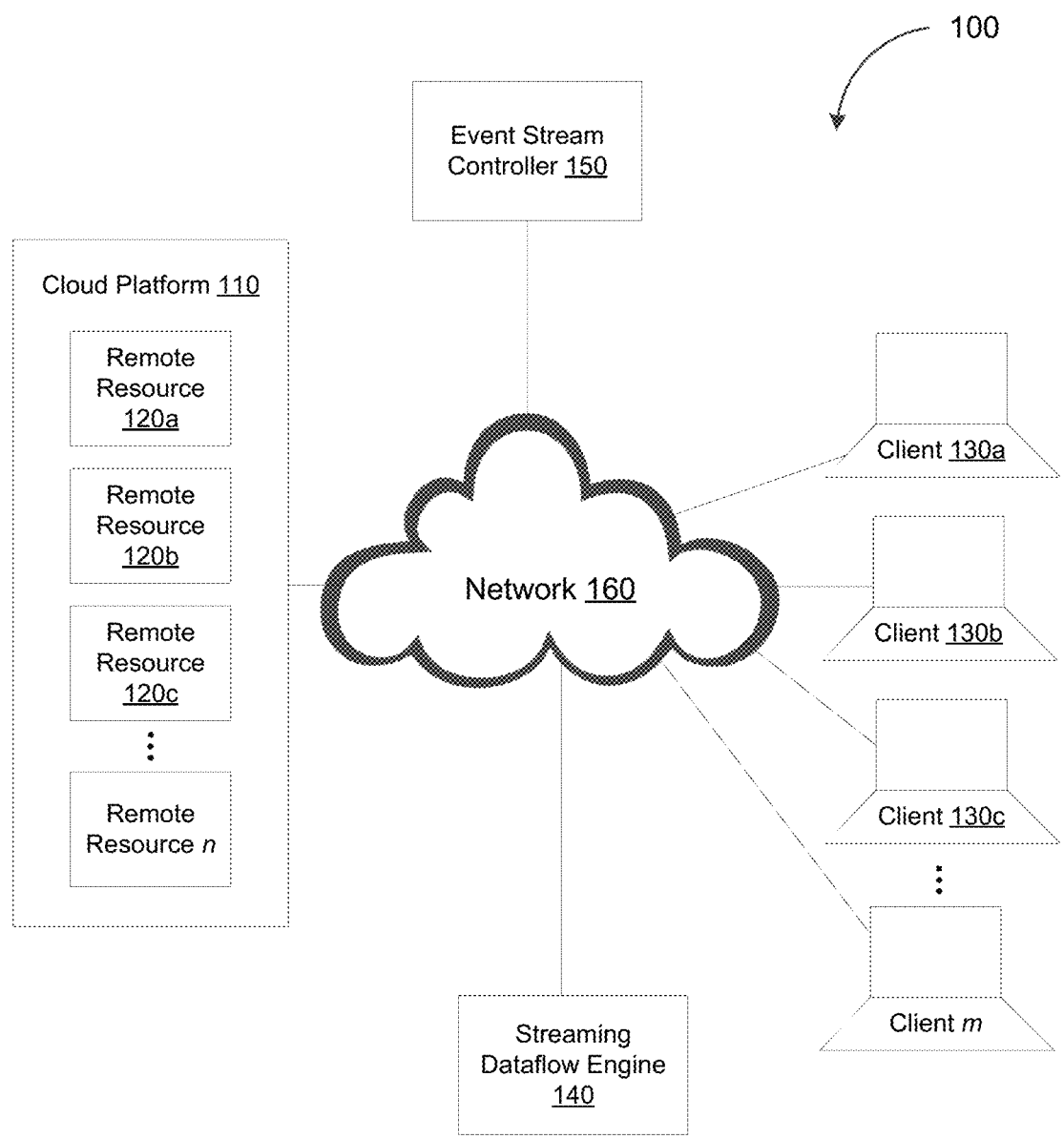
FIG. 1 depicts a system diagram illustrating a cloud computing system, in accordance with some example embodiments.

When practical, like labels are used to refer to same or similar items in the drawings.

DETAILED DESCRIPTION

A multitude of clients may interact with a cloud-based application hosted by a third-party provider on remote resources (e.g., servers, databases, and/or the like) housed in data centers. These interactions may affect the state of the remote resources hosting the cloud-based application. As such, a streaming dataflow engine may collect a real time event stream that includes metrics indicative of the state of the remote resources. For example, the real time event stream associated with the cloud-based application may include a series of events, each of which including one or more metrics such as, for example, a quantity of connections, memory use, host level central processing unit (CPU) utilization, network level disk usage, and/or the like. Moreover, the real time event stream may include events associated with multiple remote resources hosting the cloud-based application. Nevertheless, comingling events originating from multiple remote resources may obscure anomalous patterns that emerge across a sequence of events. Accordingly, in some example embodiments, an event stream controller may be configured to segregate a real time event stream into multiple child streams, each of which corresponding to a single remote resource. The event stream controller may be further configured to identify patterns in each individual child stream and generate alerts when the event stream controller encounters an anomalous pattern.

FIG. 1 depicts a system diagram illustrating a cloud computing system 100, in accordance with some example embodiments. Referring to FIG. 1, the cloud computing system 100 may include a cloud platform 110. As shown in FIG. 1, the cloud platform 110 may include an n quantity of remote resources including, for example, a first remote resource 120a, a second remote resource 120b, a third remote resource 130c, and/or the like. The n quantity of remote resources may include cloud infrastructure hardware and/or software including, for example, servers, databases, and/or the like. Moreover, the n quantity of remote resources may host a cloud-based application providing, for example, solutions for sourcing, procurement, payments, and/or the like.

The cloud-based application may be available as a software-as-a-service (SaaS) that is accessible, over a network 160, to an m quantity of clients including, for example, a first client 130a, a second client 130b, a third client 130c, and/or the like. It should be appreciated that the network 160 may be any wired and/or wireless network including, for example, a local area network (LAN), a virtual local area network (VLAN), a wide area network (WAN), a public land mobile network, the Internet, and/or the like. Moreover, in addition to software-as-a-service, the cloud platform 110 may be configured to provide other cloud-based services including, for example, platform-as-a-service (PaaS), infrastructure-as-a-service (IaaS), desktop as a service (DaaS), management software as a service (MSaaS), mobile backend as a service (MBaaS), information technology management as a service (ITMaaS), and/or the like. One or more of the m quantity of clients may interact with the cloud platform 110 in order to access the cloud-based application hosted on one or more of the n quantity of remote resources. The interactions between one or more of the m quantity of clients and the cloud platform 110 may affect the state of one or more of the n quantity of remote resources.

Referring again to FIG. 1, the cloud computing system 100 may include a streaming dataflow engine 140. The streaming dataflow engine 140 may be configured to collect a real time event stream that includes metrics indicative of the state of the n quantity of remote resources. For example, the streaming dataflow engine 140 may collect a real time event stream that includes a series of events, each of which including one or more metrics such as, for example, a quantity of connections, memory use, host level central processing unit (CPU) utilization, network level disk usage, and/or the like. The real time event stream may further include events originating from one or more of the n quantity of remote resources including, for example, the first remote resource 120a, the second remote resource 120b, the third remote resource 120c, and/or the like. That is, the real time event stream may comingle events associated with multiple remote resources including, for example, events associated with the first remote resource 120a, events associated with the second remote resource 120b, events associated with the third remote resource 120c, and/or like.

As noted, comingling events originating from multiple remote resources may obscure anomalous patterns that emerge across a sequence of events. For example, an anomalous pattern indicative of a fault at the first remote resource 120a may be obscured by the events associated with the first remote resource 120a being comingled with events originating from other remote resources such as, for example, the second remote resource 120b, the third remote resource 120c, and/or the like. As such, in some example embodiments, the cloud computing system 110 may include an event stream controller 150 configured to segregate a real time event stream including events from multiple remote resources into multiple child streams, each of which corresponding to a single remote resource. For instance, the real time event stream may be segregated into multiple child streams based on an identifier (e.g., hostname and/or the like) associated with each of the first remote resource 120a, the second remote resource 120b, the third remote resource 120c, and/or the like. Accordingly, the real time event stream may be segregated into a first child stream that includes events from the first remote resource 120a, a second child stream that includes events from the second remote resource 120b, a third child stream that includes events from the third remote resource 120c, and/or the like.

In some example embodiments, the event stream controller 150 may be further configured to analyze each child stream in order to identify one or more patterns. To further illustrate, Table 1 below depicts a series of events originating from a single remote resource. The series of events shown in Table 1 may be included in a child stream associated with the remote resource. Accordingly, the event stream controller 150 may analyze a child stream to identify, at the corresponding remote resource, patterns consistent with a decrease in a value of a metric, an increase in a difference between an estimated value of the metric and actual value of the metric, and/or the difference between the estimated value of the metric and the actual value of the metric exceeding a threshold value. Alternatively and/or additionally, the event stream controller 150 may analyze each child stream to identify patterns in which the decrease in the value of the metric, the increase in the difference between the estimated value of the metric and the actual value of the metric, and/or the difference between the estimated value of the metric and the actual value of the metric exceeding the threshold value persisting over a threshold quantity of events and/or a threshold length of time.

For instance, the event stream controller 150 may analyze a child stream to identify patterns consistent with a decrease in a quantity of connections (e.g., the value associated with "numConn"), an increase in a difference between estimated memory use (e.g., the value associated with "memoryEst") and actual memory use (e.g., the value associated with "memory"), a difference between estimated memory use and actual memory use exceeding a threshold value, and/or the like. Alternatively and/or additionally, the event stream controller 150 may analyze each child stream to identify patterns in which the decrease in the quantity of connections, the increase in the difference between estimated memory use and actual memory use, and/or the difference between estimated memory use and actual memory use exceeding the threshold value persist over a threshold quantity of events and/or a threshold length of time.

TABLE 1

{"instanceInfo": {"host": "web42.snv.ariba.com"}, "values": {"load": 918.61,
"numConn": 795.5, "totalProc": 2328.4, "totalThreads": 5220.4, "memory": 1.031,
"timeStamp": "2018-09-20T19:45:00Z", "usageSystem": 14.669, "memoryEst": "78.65"}},
{"instanceInfo": {"host": "web42.snv.ariba.com"}, "values": {"load": 772.488,
"numConn": 781, "totalProc": 2337.4, "totalThreads": 5309.4, "memory": 0.925,
"timeStamp": "2018-09-20T19:50:00Z", "usageSystem": 12.904, "memoryEst": "78.7"}},
{"instanceInfo": {"host": "web42.snv.ariba.com"}, "values": {"load": 696.532,
"numConn": 770.5, "totalProc": 2341, "totalThreads": 5225.2, "memory": 0.843,
"timeStamp": "2018-09-20T19:55:00Z", "usageSystem": 31.833, "memoryEst": "78.77"}},
{"instanceInfo": {"host": "web42.snv.ariba.com"}, "values": {"load": 710.13,
"numConn": 379, "totalProc": 2337.6, "totalThreads": 4896.6,
"memory": 0.90, "timeStamp": "2018-09-20T20:00:00Z", "usageSystem": 31.966,
"memoryEst": "81.29"}},
{"instanceInfo": {"host": "web42.snv.ariba.com"}, "values": {"load": 735.134,
"numConn": 350, "totalProc": 2345, "totalThreads": 4915, "memory": 1.01, "timeStamp":
"2018-09-20T20:05:00Z", "usageSystem": 14.591, "memoryEst": "81.50"}},
{"instanceInfo": {"host": "web42.snv.ariba.com"}, "values": {"load": 862.564,
"numConn": 375, "totalProc": 2346.2, "totalThreads": 4957, "memory": 1.035,
"timeStamp": "2018-09-20T20:10:00Z", "usageSystem": 13.648, "memoryEst": "81.32"}}

In some example embodiments, the event stream controller 150 may be configured to generate an alert when the event stream controller 150 encounters an anomalous pattern indicative, for example, of a fault at one or more of the n quantity of remote resources. The event stream controller 150 may determine, for the alert, a priority corresponding to the anomalous pattern. For example, a pattern in which the decrease in the quantity of connections, the increase in the difference between estimated memory use and actual memory use, and/or the difference between estimated memory use and actual memory use exceeding the threshold value persist over a threshold quantity of events and/or a threshold length of time may trigger a high priority alert. Alternatively and/or additionally, the event stream controller 150 may identify, based at least on the anomalous pattern, one or more recipients for the alert. For instance, the event stream controller 150 may determine to send, based at least on the anomalous pattern, a corresponding alert to the first client 130a. However, the event stream controller 150 may not send the alert to the second client 130b if the event stream controller 150 determines that the second client 130b has already received an alert regarding the anomalous pattern. In doing so, the event stream controller 150 may minimize the quantity of duplicate and/or irrelevant alerts sent to the first client 130a and/or the second client 130b.

Figure 2:
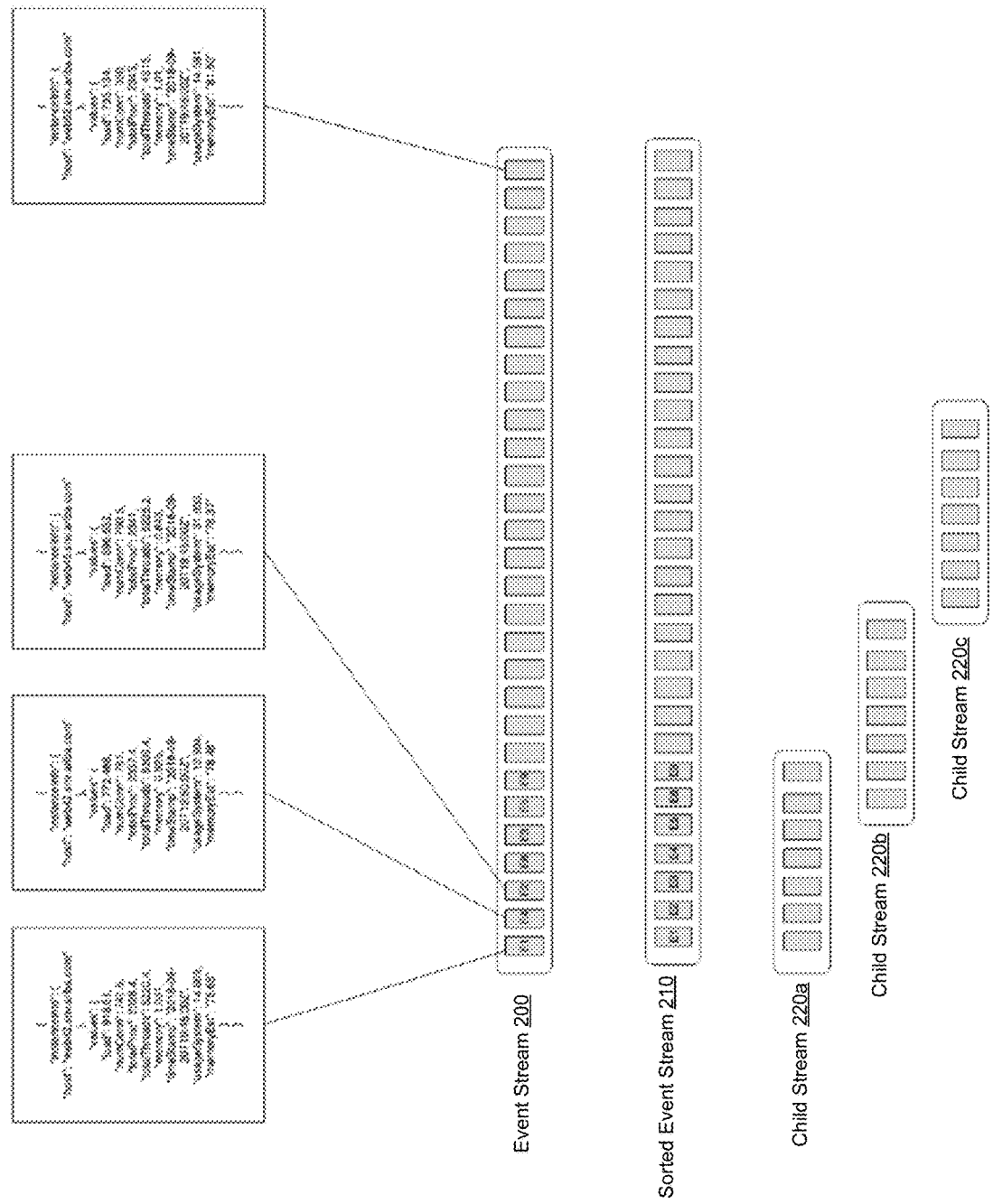
FIG. 2 depicts an example of an event stream, in accordance with some example embodiments.

FIG. 2 depicts an example of an event stream 200, in accordance with some example embodiments. Referring to FIGS. 1-2, the streaming dataflow engine 140 may collect, from the cloud platform 110, an event stream 200. The event stream 200 may include a plurality of events including, for example, a first event $E_1$, a second event $E_2$, a third event $E_3$, a fourth event $E_4$, a fifth event $E_5$, and/or the like. The first event $E_1$, the second event $E_2$, the third event $E_3$, the fourth event $E_4$, and/or the fifth event $E_5$ may originate from one of the n quantity of remote resources shown in FIG. 1. Accordingly, the first event $E_1$, the second event $E_2$, the third event $E_3$, the fourth event $E_4$, and/or the fifth event $E_5$ may each include an identifier of a corresponding remote resource such as, for example, a hostname and/or the like. Moreover, the first event $E_1$, the second event $E_2$, the third event $E_3$, the fourth event $E_4$, and/or the fifth event $E_5$ may each include one or more metrics indicative of a state of the corresponding remote resource including, for example, a quantity of connections, estimated memory use, actual memory use, host level central processing unit (CPU) utilization, network level disk usage, and/or the like. It should be appreciated that the event stream 200 may be asynchronous such that the events added to the event stream 200 in a non-sequential order. For instance, the event stream 200 may include a gap due to a sixth event $E_6$ and a seventh event $E_7$ arriving after an eight event $E_8$ and a ninth event $E_9$.

As shown in FIG. 2, the event stream 200 may be sorted in order to generate a sorted event stream 210. For instance, the first event $E_1$, the second event $E_2$, the third event $E_3$, the fourth event $E_4$, and/or the fifth event $E_5$ may each include a timestamp. Accordingly, the event stream 200 may be sorted based at least on the timestamp of each event included in the event stream 200. The events included in the sorted event stream 210 may therefore be sorted in a chronological order in which the first event $E_1$ and the second $E_2$ precede the fourth event $E_4$ because the first event $E_1$ and the second $E_2$ are associated with an earlier timestamp (e.g., 2018-09-20T19:45:00Z) than the fourth event $E_4$ (e.g., 2018-09-20T19:50:00Z).

In some example embodiments, the event stream controller 150 may segregate the event stream 200 into multiple child streams including, for example, a first child stream 220a, a second child stream 220b, a third child stream 220c, and/or the like. Each of the first child stream 220a, the second child stream 220b, and the third child stream 220c may be associated with a corresponding remote resource and may therefore include events originating from the corresponding remote resource. For example, the first event $E_1$ may be identified as being associated with the first remote resource 120a based at least on the hostname "web42.snv.ariba.com" included in the first event $E_1$ while the second event $E_2$ may be identified as being associated with the second remote resource 120b based at least on the hostname "web45.snv.ariba.com" included in the second event $E_2$. Accordingly, the event stream controller 150 may include the first event $E_1$ in the first child stream 220a associated with the first remote resource 120a and the second event $E_2$ in the second child stream 220b associated with the second remote resource 120b.

The event stream controller 150 may analyze each of the first child stream 220a, the second event stream 220b, and the third event stream 220c in order to identify one or more patterns which, as noted, may be indicative of a fault at the corresponding remote resources. For example, the event stream controller 150 may analyze the first child stream 220a to identify, at the corresponding first remote resource 120a, patterns consistent with a decrease in a quantity of connections (e.g., the value associated with "numConn"), an increase in a difference between estimated memory use (e.g., the value associated with "memoryEst") and actual memory use (e.g., the value associated with "memory"), a difference between estimated memory use and actual memory use exceeding a threshold value, and/or the like. Alternatively and/or additionally, the event stream controller 150 may analyze the first child stream 220a to identify patterns in which the decrease in the quantity of connections, the increase in the difference between estimated memory use and actual memory use, and/or the difference between estimated memory use and actual memory use exceeding the threshold value persist over a threshold quantity of events and/or a threshold length of time.

Figure 3:
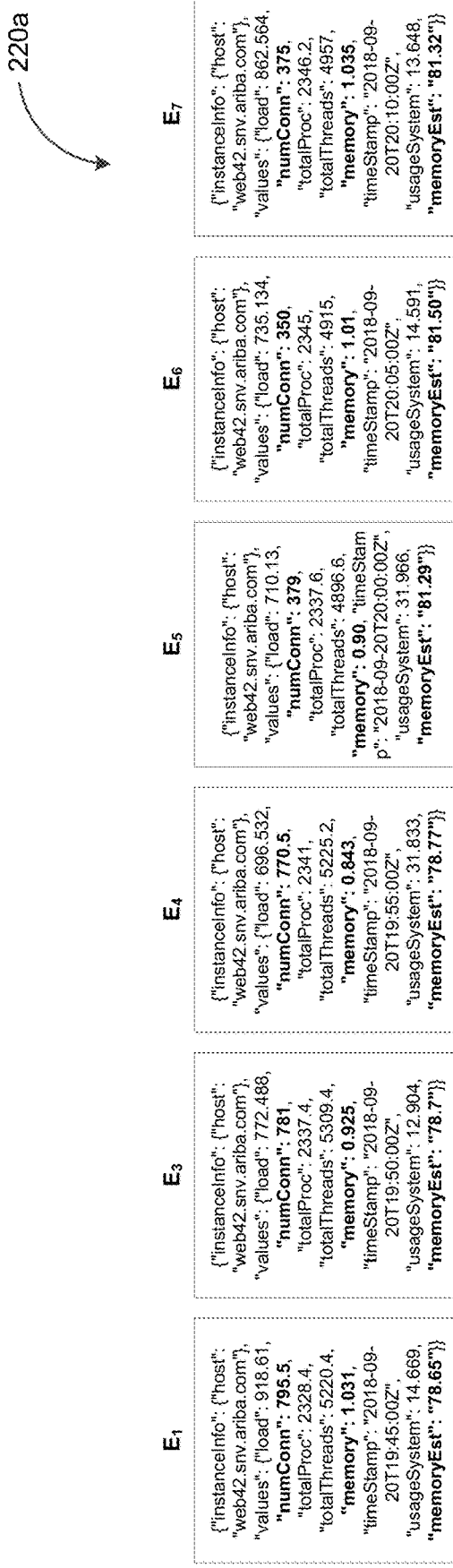
FIG. 3 depicts an example of a pattern in an event stream, in accordance with some example embodiments.

To further illustrate, FIG. 3 depicts an example of a pattern in an event stream, in accordance with some example embodiments. In some example embodiments, the event stream controller 150 may analyze the first child stream 220a and identify the patterns shown in FIG. 3. Referring to FIGS. 1-3, the first child stream 220a may include a series of events originating from the first remote resource 120a including, for example, the first event $E_1$, the third event $E_3$, the fourth event $E_4$, the fifth event $E_5$, a sixth event $E_6$, and a seventh event $E_7$. As shown in FIG. 3, the first event $E_1$, the third event $E_3$, the fourth event $E_4$, the fifth event $E_5$, the sixth event $E_6$, and the seventh event $E_7$ may exhibit a pattern in which the quantity of connections (e.g., the value of "numConn") is decreasing and the difference between estimated memory use (e.g., the value associated with "memoryEst") and actual memory use (e.g., the value associated with "memory") is increasing. Moreover, FIG. 3 shows a pattern in which the decrease the quantity of connections and the increase in the difference between estimated memory use and actual memory use persist over more than a threshold quantity of events (e.g., 6 events and/or a different threshold quantity).

In the event the event stream controller 150 identifies, in the first child stream 220a associated with the first remote resource 120a, an anomalous pattern such, for example, as one or more of the patterns shown in FIG. 3, the event stream controller 150 generate an alert. According to some example embodiments, the event stream controller 150 may determine, for the alert, a priority corresponding to the anomalous pattern. For example, the pattern in which the decrease in the quantity of connections and/or the increase in the difference between estimated memory use and actual memory use persist over a threshold quantity of events may trigger a high priority alert. Alternatively and/or additionally, the event stream controller 150 may identify, based at least on the anomalous pattern, one or more recipients for the alert. For instance, the event stream controller 150 may determine to send, based at least on the anomalous pattern, a corresponding alert to the first client 130a. However, the event stream controller 150 may not send the alert to the second client 130b if the event stream controller 150 determines that the second client 130b has already received an alert regarding the anomalous condition. In doing so, the event stream controller 150 may minimize the quantity of duplicate and/or irrelevant alerts sent to the first client 130a and/or the second client 130b.

Figure 4:
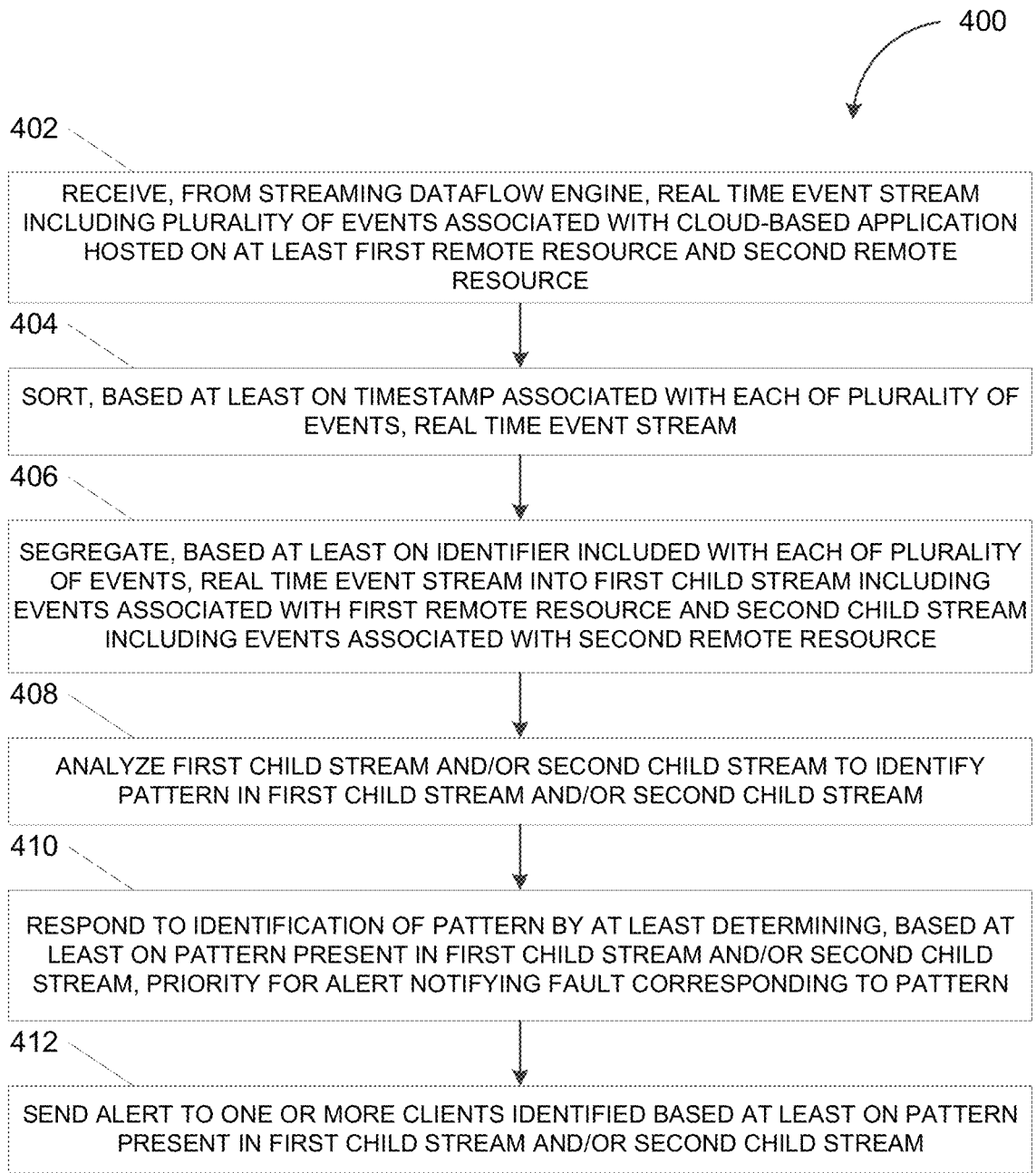
FIG. 4 depicts a flowchart illustrating a process for segregating real time event streams, in accordance with some example embodiments.

FIG. 4 depicts a flowchart illustrating a process 400 for segregating a real time event stream, in accordance with some example embodiments. Referring to FIGS. 1-4, the process 400 may be performed by the event stream controller 150.

At 402, the event stream controller 150 may receive, from the streaming dataflow engine 140, a real time event stream including a plurality of events associated with a cloud-based application hosted on at least a first remote source and a second remote resource. For example, as shown in FIGS. 1-2, the streaming dataflow engine 140 may collect, from the cloud platform 110, the event stream 200. As noted, the event stream 200 may include a plurality of events (e.g., the first event $E_1$, the second event $E_2$, the third event $E_3$, the fourth event $E_4$, and/or the fifth event $E_5$, and/or the like), each of which originating from one of the n quantity of remote resources shown in FIG. 1. Accordingly, the event stream controller 150 may receive, from the streaming dataflow engine 140, the event stream 200 for further processing and/or analysis.

At 404, the event stream controller 150 may sort, based at least on a timestamp associated with each of the plurality of events, the real time event stream. Referring again to FIG. 2, the event stream controller 150 may sort the event stream 200 based on the timestamp included with each of the first event $E_1$, the second event $E_2$, the third event $E_3$, the fourth event $E_4$, and/or the fifth event $E_5$. The events in the resulting sorted event stream 210 may be sorted in a chronological order in which the first event $E_1$ and the second $E_2$ precede the fourth event $E_4$ because the first event $E_1$ and the second $E_2$ are associated with an earlier timestamp (e.g., 2018-09-20T19:45:00Z) than the fourth event $E_4$ (e.g., 2018-09-20T19:50:00Z).

At 406, the event stream controller 150 may segregate, based at least on an identifier included with each of the plurality of events, the real time event stream into a first child stream including events associated with the first remote resource and a second child stream including events associated with the second remote resource. In some example embodiments, each of the first event $E_1$, the second event $E_2$, the third event $E_3$, the fourth event $E_4$, and/or the fifth event $E_5$ may include an identifier (e.g., a hostname and/or the like) of a corresponding resource that enables the event stream controller 150 to assign the event to an appropriate child stream. For instance, the first event $E_1$ may be identified as being associated with the first remote resource 120a based at least on the hostname "web42.snv.ariba.com" included in the first event $E_1$ while the second event $E_2$ may be identified as being associated with the second remote resource 120b based at least on the hostname "web45.snv.ariba.com" included in the second event $E_2$. Accordingly, the event stream controller 150 may include the first event $E_1$ in the first child stream 220a associated with the first remote resource 120a and the second event $E_2$ in the second child stream 220b associated with the second remote resource 120b.

At 408, the event stream controller 150 may analyze the first child stream and/or the second child stream to identify, in the first child stream and/or the second child stream, a pattern. For example, the event stream controller 150 may analyze each of the first child stream 220a, the second event stream 220b, and the third event stream 220c in order to identify one or more patterns which, as noted, may be indicative of a fault at the corresponding remote resources. As shown in FIG. 3, the event stream controller 150 may analyze the first child stream 220a to identify, at the corresponding first remote resource 120a, patterns consistent with a decrease in a quantity of connections (e.g., the value associated with "numConn"), an increase in a difference between estimated memory use (e.g., the value associated with "memoryEst") and actual memory use (e.g., the value associated with "memory"), a difference between estimated memory use and actual memory use exceeding a threshold value, and/or the like. Alternatively and/or additionally, the event stream controller 150 may analyze the first child stream 220a to identify patterns in which the decrease in the quantity of connections, the increase in the difference between estimated memory use and actual memory use, and/or the difference between estimated memory use and actual memory use exceeding the threshold value persist over a threshold quantity of events and/or a threshold length of time.

At 410, the event stream controller 150 may respond to the identification of the pattern by at least determining, based at least on the pattern present in the first child stream and/or the second child stream, a priority for an alert notifying a fault corresponding to the pattern. In some example embodiments, the event stream controller 150 generate an alert upon identifying, in the first child stream 220a associated with the first remote resource 120a, an anomalous pattern. The event stream controller 150 may further determine, for the alert, a priority corresponding to the anomalous pattern. For instance, the pattern in which the decrease in the quantity of connections and/or the increase in the difference between estimated memory use and actual memory use persist over a threshold quantity of events may trigger a high priority alert.

At 412, the event stream controller 150 may send, to one or more clients identified based at least on the pattern present in the first child stream and/or the second child stream, the alert. In some example embodiments, the event stream controller 150 may identify, based at least on the anomalous pattern present in the first child stream 220a, one or more recipients for the corresponding alert. Accordingly, the event stream controller 150 may send, based at least on the anomalous pattern, a corresponding alert to the first client 130a but not the second client 130b. As noted, in doing so, the event stream controller 150 may minimize the quantity of duplicate and/or irrelevant alerts sent to the first client 130a and/or the second client 130b.

Figure 5:
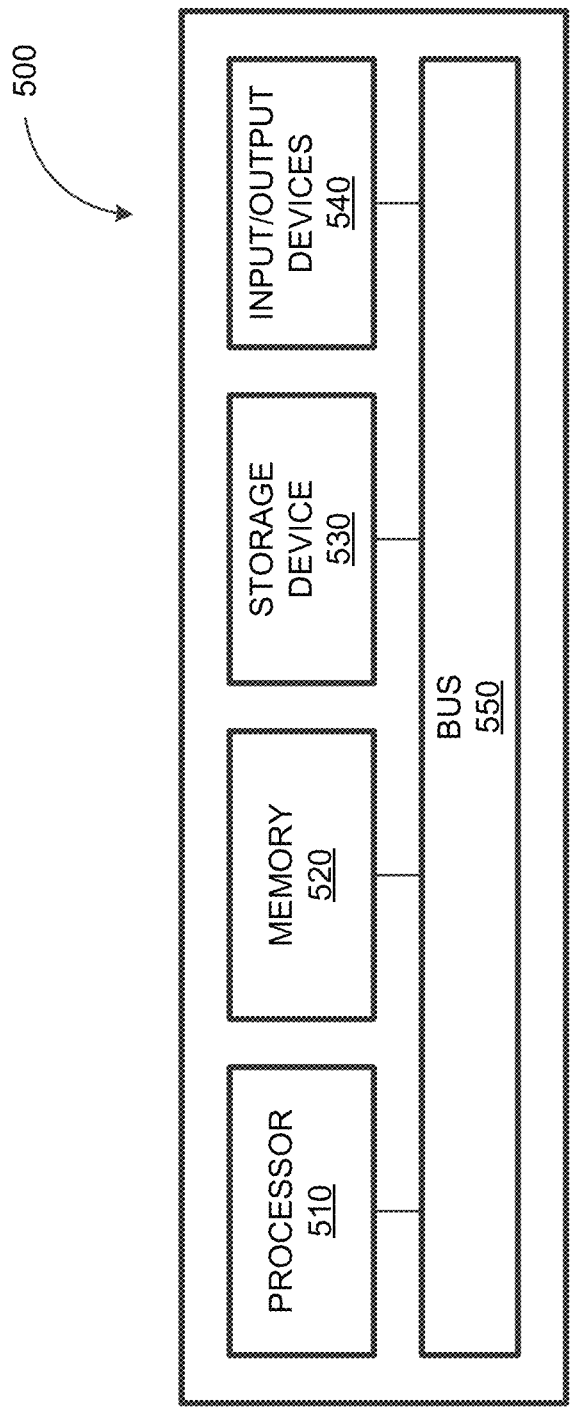
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1-5, the computing system 500 can be used to implement the event stream controller 150 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the event stream controller 150. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include users and servers. A user and server are generally remote from each other and typically interact through a communication network. The relationship of user and server arises by virtue of computer programs running on the respective computers and having a user-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows can include different and/or additional operations than shown without departing from the scope of the present disclosure. One or more operations of the logic flows can be repeated and/or omitted without departing from the scope of the present disclosure. Other implementations can be within the scope of the following claims.

What is claimed is:

1. A system, comprising:
at least one data processor; and
at least one memory storing instructions which, when executed by the at least one data processor, result in operations comprising:
receiving a plurality of events associated with a cloud-based application, the cloud-based application being hosted on a first remote resource and a second remote resource, the plurality of events including one or more metrics indicative of a state of the first remote resource and/or the second remote resource, the one or more metrics including a quantity of connections, an estimated memory use, and an actual memory use, the plurality of events being received in an event stream in which at least a first event associated with the first remote resource is comingled with a second event associated with the second remote resource;
segregating, based at least on an identifier included with each of the plurality of events, the event stream, the event stream being segregated into a first child stream and a second child stream, the first child stream including the first event associated with the first remote resource, and the second child stream including the second event associated with the second remote resource;
analyzing the first child stream and/or the second child stream to identify a pattern in the first child stream and/or the second child stream, the pattern indicative of a fault at the first remote resource associated with the first child stream and/or the second remote resource associated with the second child stream, the pattern including the quantity of connections decreasing while a difference between the estimated memory use and the actual memory use is increasing; and
sending, to a first client, an alert comprising a notification of the fault at the first remote resource and/or the second remote resource.

2. The system of claim 1, wherein the one or more metrics further include a host level central processing unit (CPU) utilization and/or a network level disk usage.

3. The system of claim 1, wherein the pattern further comprises the difference between the estimated memory use and the actual memory use exceeding a threshold value.

4. The system of claim 3, wherein the pattern further comprises the quantity of connections decreasing and the difference between the estimated memory use and the actual memory use increasing over a threshold quantity of events and/or a threshold length of time.

5. The system of claim 1, wherein the identifier included with each of the plurality of events comprises a first hostname of the first remote resource and a second hostname of the second remote resource.

6. The system of claim 1, further comprising:
determining, based at least on the pattern present in the first child stream and/or the second child stream, a priority for the alert.

7. The system of claim 1, further comprising:
identifying, based at least on the pattern present in the first child stream and/or the second child stream, one or more recipients for the alert.

8. The system of claim 7, wherein the one or more recipients include the first client but exclude a second client based at least on the second client having already received the alert.

9. The system of claim 1, wherein the event stream is received from a streaming dataflow engine, and wherein the event stream comprises a real time event stream the streaming dataflow engine collects from a cloud platform including the first remote resource and the second remote resource.

10. The system of claim 1, further comprising:
sorting, based at least on a timestamp included with each of the plurality of events, the event stream before segregating the event stream into the first child stream and the second child stream.

11. A computer-implemented method, comprising:
receiving a plurality of events associated with a cloud-based application, the cloud-based application being hosted on a first remote resource and a second remote resource, the plurality of events including one or more metrics indicative of a state of the first remote resource and/or the second remote resource, the one or more metrics including a quantity of connections, an estimated memory use, and an actual memory use, the plurality of events being received in an event stream in which at least a first event associated with the first remote resource is comingled with a second event associated with the second remote resource;

segregating, based at least on an identifier included with each of the plurality of events, the event stream, the event stream being segregated into a first child stream and a second child stream, the first child stream including the first event associated with the first remote resource, and the second child stream including the second event associated with the second remote resource;

analyzing the first child stream and/or the second child stream to identify a pattern in the first child stream and/or the second child stream, the pattern indicative of a fault at the first remote resource associated with the first child stream and/or the second remote resource associated with the second child stream, the pattern including the quantity of connections decreasing while a difference between the estimated memory use and the actual memory use is increasing; and sending, to a first client, an alert comprising a notification of the fault at the first remote resource and/or the second remote resource.

12. The method of claim 11, wherein the one or more metrics further include a host level central processing unit (CPU) utilization and/or a network level disk usage.

13. The method of claim 11, wherein the pattern further comprises the difference between the estimated memory use and the actual memory use exceeding a threshold value.

14. The method of claim 13, wherein the pattern further comprises the quantity of connections decreasing and the difference between the estimated memory use and the actual memory use increasing over a threshold quantity of events and/or a threshold length of time.

15. The method of claim 11, wherein the identifier included with each of the plurality of events comprises a first hostname of the first remote resource and a second hostname of the second remote resource.

16. The method of claim 11, further comprising:
determining, based at least on the pattern present in the first child stream and/or the second child stream, a priority for the alert.

17. The method of claim 11, further comprising:
identifying, based at least on the pattern present in the first child stream and/or the second child stream, one or more recipients for the alert, the one or more recipients including the first client but excluding a second client based at least on the second client having already received the alert.

18. The method of claim 11, wherein the event stream is received from a streaming dataflow engine, and wherein the event stream comprises a real time event stream the streaming dataflow engine collects from a cloud platform including the first remote resource and the second remote resource.

19. The method of claim 11, further comprising:
sorting, based at least on a timestamp included with each of the plurality of events, the event stream before segregating the event stream into the first child stream and the second child stream.

20. A non-transitory computer readable medium storing instructions, which when executed by at least one data processor, result in operations comprising:

receiving a plurality of events associated with a cloud-based application, the cloud-based application being hosted on a first remote resource and a second remote resource, the plurality of events including one or more metrics indicative of a state of the first remote resource and/or the second remote resource, the one or more metrics including a quantity of connections, an estimated memory use, and an actual memory use, the plurality of events being received in an event stream in which at least a first event associated with the first remote resource is comingled with a second event associated with the second remote resource;

segregating, based at least on an identifier included with each of the plurality of events, the event stream, the event stream being segregated into a first child stream and a second child stream, the first child stream including the first event associated with the first remote resource, and the second child stream including the second event associated with the second remote resource;

analyzing the first child stream and/or the second child stream to identify a pattern in the first child stream and/or the second child stream, the pattern indicative of a fault at the first remote resource associated with the first child stream and/or the second remote resource associated with the second child stream, the pattern including the quantity of connections decreasing while a difference between the estimated memory use and the actual memory use is increasing; and sending, to a first client, an alert comprising a notification of the fault at the first remote resource and/or the second remote resource.

* * * * *